United States Patent
Dosh

(10) Patent No.: US 8,671,245 B2
(45) Date of Patent: Mar. 11, 2014

(54) USING IDENTIFICATION IN CACHE MEMORY FOR PARALLEL REQUESTS

(75) Inventor: Eran Dosh, Tel Mond (IL)

(73) Assignee: LSI Corporation, San Jose, CA (US)

( * ) Notice: Subject to any disclaimer, the term of this patent is extended or adjusted under 35 U.S.C. 154(b) by 224 days.

(21) Appl. No.: 12/978,810

(22) Filed: Dec. 27, 2010

(65) Prior Publication Data

US 2012/0166694 A1    Jun. 28, 2012

(51) Int. Cl.
*G06F 12/00*    (2006.01)

(52) U.S. Cl.
USPC ........... 711/118; 711/119; 711/120; 711/130; 711/140

(58) Field of Classification Search
USPC .......................... 711/118, 130, 140, 119, 120
See application file for complete search history.

(56) References Cited

U.S. PATENT DOCUMENTS

| | | | |
|---|---|---|---|
| 5,353,428 A * | 10/1994 | Shibata | 711/145 |
| 6,507,894 B1 * | 1/2003 | Hoshi | 711/137 |
| 6,734,867 B1 * | 5/2004 | Munshi et al. | 345/557 |
| 6,988,167 B2 * | 1/2006 | Allen et al. | 711/128 |
| 7,472,226 B1 | 12/2008 | Emma et al. | |
| 2010/0100685 A1 * | 4/2010 | Kurosawa et al. | 711/128 |
| 2012/0072669 A1 * | 3/2012 | Nishiguchi et al. | 711/135 |

OTHER PUBLICATIONS

"Cortex-R4—A comparison with the ARM9E processor family" by Peter Lewin, Frontier Journal, vol. 5, No. 3, Mar. 2008, pp. 1-2, 6-12.

* cited by examiner

*Primary Examiner* — Hong Kim
(74) *Attorney, Agent, or Firm* — Mendelsohn, Drucker & Dunleavy, P.C.; Steve Mendelsohn

(57) ABSTRACT

In an exemplary computer system having one or more masters configured to the same slave memory using a protocol, such as the AMBA AXI protocol, a master provides an ID field to the memory as part of a data request, where the ID field has a line ID sub-field that represents a line ID value that uniquely identifies a particular cache line (or subset of cache lines) in the master, where the memory returns the line ID value back to the master along with the retrieved data. The master uses the line ID value to identify the cache line into which the retrieved data is to be stored. In this way, the master does not need to maintain a queue of address buffers to retain the addresses for data requests currently being processed, where the size of the queue limits the number of parallel in-service data requests by the master.

21 Claims, 2 Drawing Sheets

USING IDENTIFICATION IN CACHE MEMORY FOR PARALLEL REQUESTS

BACKGROUND

1. Field of the Invention

The present invention relates to computer systems and, more specifically but not exclusively, to using cache memory to store and retrieve data in computer systems.

2. Description of the Related Art

This section introduces aspects that may help facilitate a better understanding of the invention. Accordingly, the statements of this section are to be read in this light and are not to be understood as admissions about what is prior art or what is not prior art.

The Advanced Microcontroller Bus Architecture (AMBA) Advanced eXtensible Interface (AXI) protocol, from Advanced RISC (Reduced Instruction Set Computer) Machine (ARM), of Cambridge, England, defines the interface between a master device, such as a cache, and a slave memory. The protocol includes an address from the cache to the memory that is coupled with an identification (ID) value. The data retrieved from the memory to the cache is coupled with the same ID value. The cache, or an arbiter, uses the ID value to differentiate between different masters that access a common slave memory such that the use of ID values enables interleaving of multiple accesses to the memory by the different masters.

The management of multiple read accesses (i.e., requests for data) by a cache involves tracking the accesses by keeping the addresses of the accesses (or the cache line numbers associated with these addresses) in the cache and coupling the addresses with the different sets of data returning from the memory. The kept addresses are used to direct the data coming from the memory into the correct locations (e.g., cache lines) in the cache, and also to compare the addresses to successive accesses to the same address, e.g., to detect when an address is already in service for a request that has not yet been completed (i.e., data is on the way). The protocol assures that back-to-back requests with the same ID number result in returned data in order. Nevertheless, using different ID numbers allows out-of-order returned data, which can also be interleaved. With this character of the protocol, the cache might use one of the following options:

1. Use only a single ID number and support one or more requests from memory. In that case, the data is assumed to be returned in order, and the cache should maintain a FIFO buffer in order to direct the returned data into the appropriate cache line. In this structure, the cache must include a number of buffers keeping addresses or cache line numbers equal to the number of requests it supports.
2. Use a few ID numbers and support several requests from memory. In that case, the data can be returned out of order, and the cache should maintain a management buffer in order to direct the returned data into the appropriate cache line. In this structure, the cache must include a number of buffers keeping addresses or cache line numbers equal to the number of requests it supports.
3. There is also an option to combine the two approaches above, where the cache uses a FIFO of buffers for each ID number it uses. Still, the cache must have as many buffers as the number of supported requests.

Maintaining a specific number of address buffers for different requests (interleaved or non-interleaved) limits the computer system to that specific number as the maximum number of different requests that the cache can handle. When all of the address buffers are occupied, the next request will pend, and the system will stall. In order to increase the number of different requests that the cache can handle, more address buffers have to be provisioned, which leads to increases in the area, power consumption, timing, complexity, and cost of the cache module.

SUMMARY

Problems in the prior art are addressed in accordance with the principles of the present invention by providing a master cache that uses an ID value that accompanies the read address for a data request transmitted to a slave memory, to identify a specific cache line in the master cache, in addition to the ID value identifying the master cache itself. In this way, in a computer system in which one or more masters are configured to a single slave memory, the master cache can use the ID value to (i) identify retrieved data corresponding to its own data requests and (ii) determine which cache line into which to store the retrieved data. Such a master cache does not need to maintain an address buffer for each data request in order to manage back-to-back or multiple, parallel data requests.

In one embodiment, the present invention is a master device for a computer system having a slave memory. The master device comprises a plurality of cache lines for storing data and a master interface for communicating with the slave memory. When processing a data request for data stored at a specified address in the slave memory, the master device transmits via the master interface to the slave memory (i) an address value corresponding to the specified address and (ii) a line identification value identifying a subset of one or more of the cache lines in the master device, such that the slave memory transmits to the master device via the master interface (i) retrieved data corresponding to the address value and (ii) the line identification value. The master device uses the line identification value received from the slave memory to determine at least one of the cache lines into which to store the retrieved data.

In another embodiment, the present invention is a computer system comprising a slave memory and one or more master devices connected to retrieve data from the slave memory. When a master device processes a data request for data stored at a specified address in the slave memory, the master device transmits to the slave memory (i) an address value corresponding to the specified address and (ii) a line identification value identifying a subset of one or more cache lines in the master device, such that the slave memory transmits to the master device via the master interface (i) retrieved data corresponding to the address value and (ii) the line identification value. The master device uses the line identification value received from the slave memory to determine at least one of the cache lines into which to store the retrieved data.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
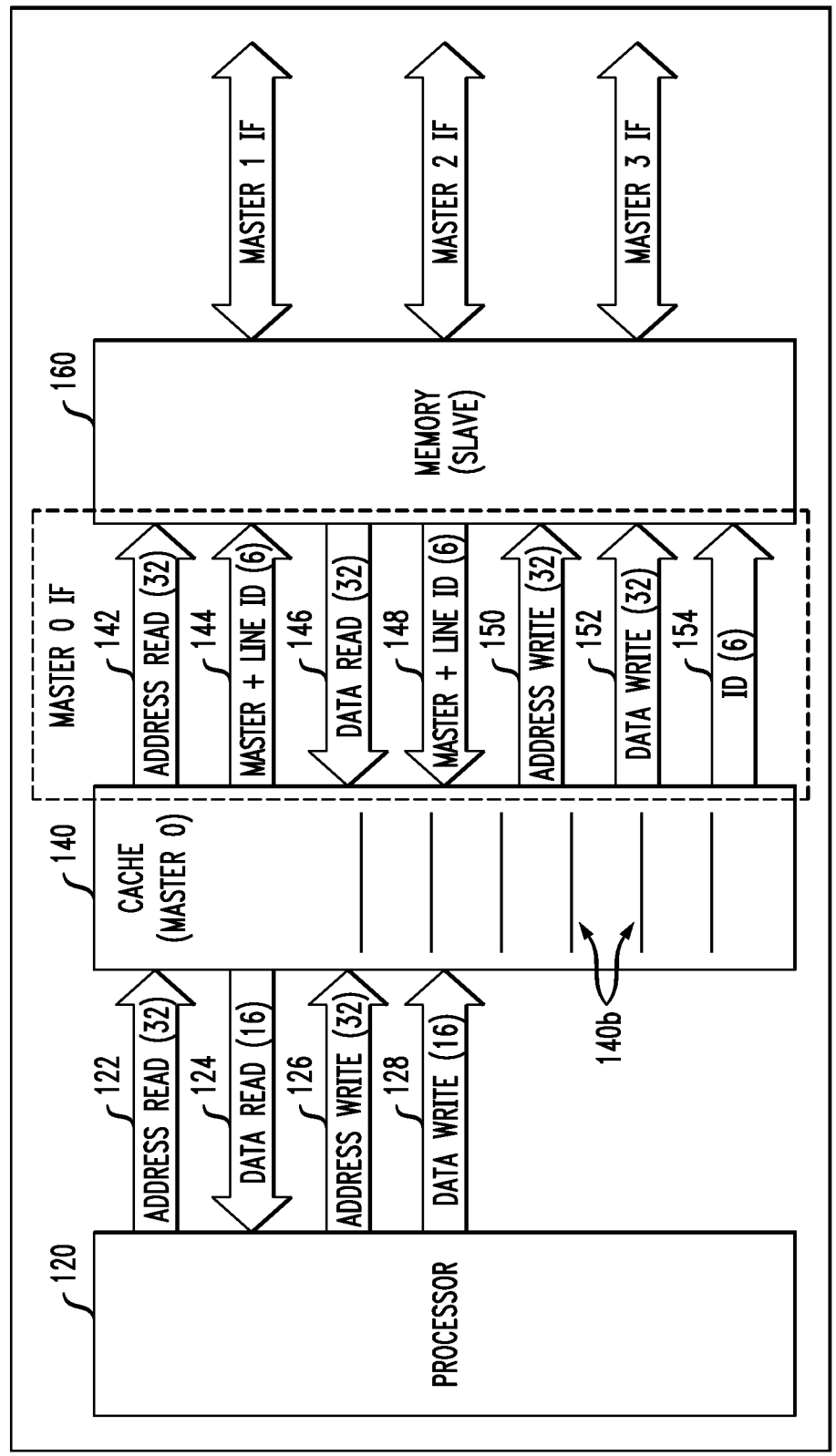
FIG. 1 shows a simplified, high-level block diagram of a computer system according to one embodiment of the present invention.

FIG. 1 shows a simplified, high-level block diagram of a computer system 100 according to one embodiment of the present invention. Computer system 100 comprises a processor (e.g., central processing unit (CPU) 120, a master (e.g., data cache) 140, and a second-level slave memory (e.g., random access memory (RAM)) 160, where the protocol between cache 140 and memory 160 is the AMBA AXI protocol. Cache 140 has a number of cache lines 140b for storing data. If processor 120 requests data that is currently stored in cache 140, then cache 140 responds to that request by providing (i.e., transmitting) that data to processor 120. If the data requested by processor 120 is not currently stored in cache 140, then cache 140 retrieves and stores the requested data from memory 160 in one its cache lines and provides that retrieved data to processor 120.

In the particular embodiment represented in FIG. 1, the interconnection between processor 120 and cache 140 includes:
- 32-bit address read bus 122 from processor 120 to cache 140 (coupled by controls such as read strobe and size);
- 16-bit data read bus 124 from cache 140 to processor 120;
- 32-bit address write bus 126 from processor 120 to cache 140 (coupled by controls such as write strobe and size); and
- 16-bit data write bus 128 from processor 120 to cache 140.

The interconnection between cache 140 and memory 160 includes:
- 32-bit address read bus 142 from cache 140 to memory 160 (coupled by controls such as read strobe and size);
- ID bus 144 from cache 140 to memory 160 (for the read access);
- 32-bit data read bus 146 from memory 160 to cache 140;
- ID bus 148 from memory 160 to cache 140 (for the read access);
- 32-bit address write bus 150 from cache 140 to memory 160 (coupled by controls such as write strobe and size);
- 32-bit data write bus 152 from cache 140 to memory 160; and
- ID bus 154 from cache 140 to memory 160 (for the write access).

In a conventional computer system, the ID fields carried by the ID buses represent a master ID value that uniquely identifies the master cache. When the cache transmits the read address to the slave memory via the address read bus, the cache also transmits the master ID value to the memory via the analog of ID bus 144. In response, when the memory transmits the retrieved data back to the cache via the data read bus, the memory also transmits the same master ID value back to the cache via the analog of ID bus 148. The cache uses the master ID value to determine that the retrieved data is in response to one of its own data read requests. In this way, a single slave memory can be configured to handle data requests from multiple masters, each having a different master ID value assigned to it.

According to certain embodiments of the present invention, such as computer system 100, in addition to a master sub-field for representing the master ID value, the ID fields carried by ID bus 144 and ID bus 148 also have a line sub-field that contains a line ID value that uniquely identifies a cache line in the particular cache that is identified by the master ID value. Analogous to the conventional computer system, master cache 140 provides the full ID field (containing both the master ID value and the line ID value) to slave memory 160 (via ID bus 144) along with the read address (via address read bus 142), and memory 160 returns the same full ID field value back to cache 140 (via ID bus 148) along with the retrieved data (via data read bus 146). Cache 140 uses (i) the master ID value to determine that the retrieved data is in response to one of its own data read requests and (ii) the line ID value to determine into which of its cache lines to store the retrieved data. As such, cache 140 does not need to maintain a queue of address buffers that store the addresses associated with the data requests that it is currently processing. Moreover, the number of interleaved read requests that cache 140 can handle is not limited by the finite size of such a queue.

In a conventional cache architecture, the least significant bits (LSBs) of the address associated with a data read request are used to determine the cache line into which retrieved data associated with the address is to be stored. When a read request is received by a cache, the tag value corresponding to the most significant bits (MSBs) of the address is stored as part of the data structure for the cache line identified by the address LSBs, where the tag value identifies a range of addresses in memory. Cache 140 of FIG. 1 can be implemented with a similar architecture.

Figure 2:
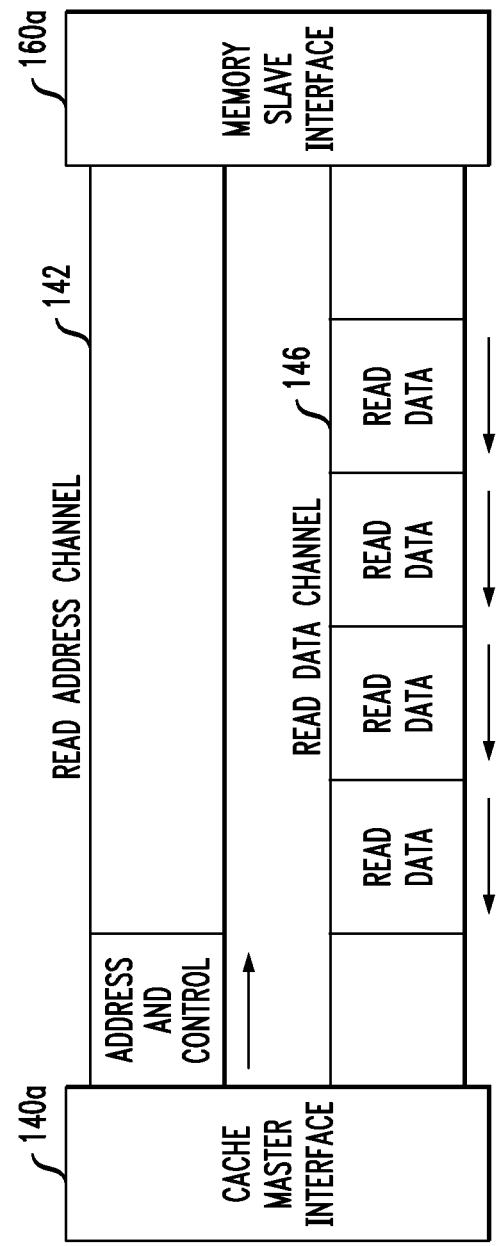
FIG. 2 represents the channel architecture for the address read bus and the data read bus between the cache interface and the memory interface of FIG. 1.

FIG. 2 represents the channel architecture for address read bus 142 and data read bus 146 between cache interface 140a of cache 140 and memory interface 160a of memory 160. Since the fill of a cache line requires multiple data, the read data is received in chunks of 4 bytes. Also note that back-to-back requests might use different ID values coupled with the address and with each data chunk. With this mechanism, the read data from the slave to the master can include interleaved data chunks with different ID values.

In one particular implementation of computer system 100 of FIG. 1, the size of cache 140 is 4 Kbytes, where the size of each cache line is 64 bytes and where cache 140 has 32 sets in a two-way set associative structure in which each set has two lines. As such, in this implementation, cache 140 has a total of 64 lines. In order to fill a 64-byte line in cache 140, a data read burst from memory 160 has 16 chunks, where each chunk is 4 bytes.

Since there are 64 lines in cache 140, six bits are needed to assign each line in cache 140 its own unique line ID value. In such an implementation, the six LSBs of each read address can be used to uniquely identify one of the 64 lines in cache 140 to use to store the data retrieved from memory 160. Those six LSBs can be the line ID value represented by the line sub-fields of the ID fields of ID buses 144 and 148. Other bits in the ID fields of ID buses 144 and 148 can be used to represent the master ID value. For example, if five other bits in the ID fields are used to represent the master ID value, then memory 160 can be simultaneously connected to up to 32 different masters.

Cache 140 can receive (at least) the three following different types of requests from processor 120: read requests, write requests, and prefetch requests. A read request is when processor 120 asks cache 140 to provide specific data. A write request is when processor 120 provides specific data to be stored into memory 160. A prefetch request is when processor 120 asks cache 140 to retrieve and store specific data from memory 160 in anticipation of a likely future read request.

When a read request is received by cache 140 (via address read bus 122), if the requested address is already stored in cache 140, as identified by the tag (i.e., the MSBs of the address), which is located in the appropriate line directed by the LSBs of the address (i.e., a hit), then cache 140 provides the requested data to processor 120 (via data read bus 124) without delay. Otherwise, there is a miss, and processor 120 is stalled while cache 140 requests the data from memory 160 (via address read bus 142 and ID bus 144). In particular, cache 140 requests 64 bytes of data from memory 160 critical word first, i.e., starting with the address of the beginning of the data requested by processor 120 (i.e., address modulo 64) and ending 64 bytes later (i.e., address modulo 64+64), and continuing in a cyclic manner as necessary to retrieve all of the data requested by processor 120. The requested data arrives at cache 140 from memory 160 via data read bus 146 as identified by the ID value on ID bus 148 and is stored in the cache line within cache 140 identified by that ID value. As soon as the requested data begins to arrive from memory 160, cache 140 can begin to provide that data to processor 120 via data read bus 124. When the requested data (starting at the critical word) arrives at processor 120, the processor can be released from its stall.

There are several approaches to handle write requests in cache architectures. The present invention does not restrict any of the conventional cache write policies such as write allocate/no-allocate and write through or back.

A prefetch request is intended to accelerate performance by filling cache 140 in advance. A prefetch request is implemented by cache 140 like a read request although it is executed in the background (i.e., only when cache 140 would otherwise be idle). A prefetch request brings data into a cache line without stalling processor 120. If a prefetch request is implemented by cache 140 early enough before a corresponding read request is received from processor 120, then the miss penalty can be avoided.

Since the filling of a cache line with data takes a few cycles, it is possible for processor 120 to transmit a subsequent request to cache 140 to the same line that is associated with a request that is currently in service (i.e., a request was sent to memory 160 but the line is not yet completely filled with retrieved data). If the particular data requested is already stored in the line, then the subsequent request will result in a hit. If the particular data requested is not yet stored in the line, then the subsequent request will result in a miss, but the subsequent request does not need to be forwarded to memory 160. In most cases, the miss penalty for a request that is already in service is smaller than the miss penalty for a new request.

According to certain embodiments of the present invention, each line of cache 140 will have a unique line ID value. In the exemplary implementation of FIG. 1, since cache 140 has 64 lines, the line ID sub-field can be implemented with 6 bits. When a read request arrives from processor 120 at cache 140 (via address read bus 122) and the request is a miss (i.e., the requested data is not already stored in cache 140 or is not already being retrieved by cache 140 as a result of a previously received read request), then cache 140 sends the address to memory 160 (via address read bus 142) along with the unique line ID value (via ID bus 144) for the cache line into which the retrieved data is to be stored without cache 142 keeping track of that request in a queue of address or line buffers. When retrieved data arrives at cache 140 from memory 160 (via data read bus 146), cache 142 uses the accompanying line ID value (received via ID bus 148) to determine into which cache line to store the received data. In this way, cache 140 can service one request after another without having to provide and maintain a queue of address oe line buffers to retain the addresses associated with "miss" data requests. Since each 64-byte data burst from memory 160 has its own line ID value associated with it, the interleaving of data associated with different requests will be handled simply by detecting the line ID values associated with the data.

Since data is received at cache 140 from memory 160 in 4-byte chunks and since each cache line can store 64 bytes of data, it takes 16 chunks of data to fill a cache line. In one implementation, each cache line has a 16-bit "valid" field, whose bits are set to indicate whether the corresponding chunks of data have been received. In that case, a full cache line will be indicated by a valid field value of all ones. In alternative implementations, a counter can be used instead of the valid field. A valid field that is only partially set (or, alternatively, an incomplete counter value) will indicate that the line is currently in service for an existing request. If another read request is received by cache 140 from processor 120 for data associated with an in-service cache line, then there will be a hit if the critical word for the subsequent read request is already in the cache line. If the requested data is not yet in the cache line, then the processor 120 will be stalled until the requested data arrives at cache 140 from memory 160, but without cache 140 having to send another read request to memory 160. In that case, there will be a miss penalty, but it will be less severe than an initial miss penalty.

If the processor 120 supports two or more requests arriving in parallel (or if cache 140 supports multiple processors that simultaneously send multiple requests), and the cache has only a single master interface, then cache 140 will need to prioritize the requests and start serving them one at a time, which might involve use of a queue for the requests until they can be sent to memory 160. In any case, after each request is sent to memory 160, the associated address does not have to be retained by cache 140, e.g., in a queue of read addresses.

Although the present invention has been described in the context of line ID values that are equal to a specified number of LSBs in the read address, the present invention is not limited to only that particular technique for assigning line ID values. The present invention can also be implemented using other suitable techniques for mapping address values to line ID values.

Although the present invention is described in the context of a line ID sub-field having enough bits such that each line in cache 140 has its own unique line ID value, the present invention can also be implemented in the context of caches in which a line ID value can map to a subset of two or more different lines in the cache. In that case, each subset of lines gets a unique line ID sub-field value. Different requests to different subsets of lines can be serviced in parallel without stalling or delaying the system. Nevertheless, two or more requests for the same subset cannot be serviced in parallel, and the system might be stalled. With this approach, the cache must keep a track of the line in a subset that is currently in service.

Although the present invention has been described in the context of ID fields that comprise a line ID sub-field that represents a line ID value and a distinct, master ID sub-field that represents a master ID value, in other embodiments, the line ID value and the master ID value can be encoded into a single, combined value to be represented in the ID fields.

Although the present invention has been described in the context of a master cache configured to a slave memory, those skilled in the art will understand that the present invention can be implemented in the context of masters other than a cache, such as a processor or direct memory access (DMA) device and/or slaves other than a memory, such as another cache. In general, a single slave can be configured to one or multiple masters, where the multiple masters can be a mixture of different types of devices.

Also, although the master is represented in the figures as being directly connected to the slave, in other embodiments, masters may be connected to the slave via a data arbiter that coordinates communications between one or more masters and the slave.

Although the present invention has been described in the context of the AMBA AXI protocol, those skilled in the art will understand that the present invention can be implemented in the context of other suitable protocols between a master and a slave, such as suitable protocols having an ID field.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A master device for a computer system having a slave memory, the master device comprising:
    a plurality of cache lines for storing data; and
    a master interface for communicating with the slave memory, wherein, when processing a data request for data stored at a specified address in the slave memory:
        the master device transmits via the master interface to the slave memory (i) an address value corresponding to the specified address, (ii) a master identification value identifying the master device, and (iii) a line identification value in addition to the master identification value and identifying a subset of one or more of the cache lines in the master device, such that the slave memory transmits to the master device via the master interface (i) retrieved data corresponding to the address value, (ii) the master identification value, and (iii) the line identification value; and
        the master device (i) uses the master identification value to verify that the retrieved data corresponds to its own data request and (ii) uses the line identification value received from the slave memory to determine at least one of the cache lines into which to store the retrieved data, wherein, after the master device transmits the address value to the slave memory, but before the master device receives the retrieved data from the slave memory, (i) the master device does not retain the address value and (ii) the master device does not retain the line identification value.

2. The invention of claim 1, wherein the master interface is configurable to:
    an address read bus for transmitting the address value from the master device to the slave memory;
    a first identification bus for transmitting the line identification value from the master device to the slave memory;
    a data read bus for transmitting the retrieved data from the slave memory to the master device; and
    a second identification bus for transmitting the line identification value from the slave memory to the master device.

3. The invention of claim 1, wherein the master device is a memory cache.

4. The invention of claim 1, wherein the interface conforms to an Advanced Microcontroller Bus Architecture (AMBA) Advanced eXtensible Interface (AXI) protocol.

5. The invention of claim 1, wherein the line identification value uniquely identifies a single cache line in the master device.

6. The invention of claim 1, wherein the line identification value is represented in a line identification sub field of an identification field that further comprises a master identification sub field that represents a master identification value that uniquely identifies the master device, such that multiple master devices can be simultaneously configured to the slave memory.

7. The invention of claim 1, wherein the master device is adapted to handle multiple, parallel data requests without maintaining a queue identifying the multiple, parallel data requests.

8. The invention of claim 1, wherein the line identification value is derived from the address value.

9. The invention of claim 1, wherein the master device is connected to receive the data request from a processor and to transmit the retrieved data to the processor.

10. The invention of claim 1, wherein:
the master interface is configurable to:
an address read bus for transmitting the address value from the master device to the slave memory;
a first identification bus for transmitting the line identification value from the master device to the slave memory;
a data read bus for transmitting the retrieved data from the slave memory to the master device; and
a second identification bus for transmitting the line identification value from the slave memory to the master device;
the line identification value uniquely identifies a single cache line in the master device;
the line identification value is represented in a line identification sub field of an identification field that further comprises a master identification sub field that represents a master identification value that uniquely identifies the master device, such that multiple master devices can be simultaneously configured to the slave memory; and
the master device is adapted to handle multiple, parallel data requests without maintaining a queue identifying the multiple, parallel data requests.

11. A computer system comprising:
a slave memory; and
one or more master devices connected to retrieve data from the slave memory, wherein, when a master device processes a data request for data stored at a specified address in the slave memory:
the master device transmits to the slave memory (i) an address value corresponding to the specified address, (ii) a master identification value identifying the master device, and (iii) a line identification value in addition to the master identification value and identifying a subset of one or more cache lines in the master device, such that the slave memory transmits to the master device via the master interface (i) retrieved data corresponding to the address value, (ii) the master identification value, and (iii) the line identification value; and
the master device (i) uses the master identification value to verify that the retrieved data corresponds to its own data request and (ii) uses the line identification value received from the slave memory to determine at least one of the cache lines into which to store the retrieved data, wherein, after the master device transmits the address value to the slave memory, but before the master device receives the retrieved data from the slave memory, (i) the master device does not retain the address value and (ii) the master device does not retain the line identification value.

12. The invention of claim 11, wherein the master device is configurable to:
an address read bus for transmitting the address value from the master device to the slave memory;
a first identification bus for transmitting the line identification value from the master device to the slave memory;
a data read bus for transmitting the retrieved data from the slave memory to the master device; and
a second identification bus for transmitting the line identification value from the slave memory to the master device.

13. The invention of claim 11, wherein:
the master device is a memory cache; and
the interface conforms to an AMBA AXI protocol.

14. The invention of claim 11, wherein the line identification value uniquely identifies a single cache line in the master device.

15. The invention of claim 11, wherein the line identification value is represented in a line identification sub field of an identification field that further comprises a master identification sub field that represents a master identification value that uniquely identifies the master device, such that multiple master devices can be simultaneously configured to the slave memory.

16. The invention of claim 11, wherein the master device is adapted to handle multiple, parallel data requests without maintaining a queue identifying the multiple, parallel data requests.

17. The invention of claim 11, wherein the line identification value is derived from the address value.

18. The invention of claim 11, wherein:
the master interface is configurable to:
an address read bus for transmitting the address value from the master device to the slave memory;
a first identification bus for transmitting the line identification value from the master device to the slave memory;
a data read bus for transmitting the retrieved data from the slave memory to the master device; and
a second identification bus for transmitting the line identification value from the slave memory to the master device;
the line identification value uniquely identifies a single cache line in the master device;
the line identification value is represented in a line identification sub field of an identification field that further comprises a master identification sub field that represents a master identification value that uniquely identifies the master device, such that multiple master devices can be simultaneously configured to the slave memory; and
the master device is adapted to handle multiple, parallel data requests without maintaining a queue identifying the multiple, parallel data requests.

19. Apparatus comprising a master device for a computer system having a slave memory, the master device comprising:
a plurality of cache lines for storing data; and
a master interface for communicating with the slave memory, wherein, when processing a data request for data stored at a specified address in the slave memory:
the master device transmits via the master interface to the slave memory (i) an address value corresponding to the specified address and (ii) a line identification value identifying a subset of one or more of the cache lines in the master device, such that the slave memory transmits to the master device via the master interface (i) retrieved data corresponding to the address value and (ii) the line identification value; and the master device uses the line identification value received from the slave memory to determine at least one of the cache lines into which to store the retrieved data, wherein:
the master interface is configurable to:
- an address read bus for transmitting the address value from the master device to the slave memory;
- a first identification bus for transmitting the line identification value from the master device to the slave memory;
- a data read bus for transmitting the retrieved data from the slave memory to the master device; and
- a second identification bus for transmitting the line identification value from the slave memory to the master device;

the line identification value uniquely identifies a single cache line in the master device;
the line identification value is represented in a line identification sub field of an identification field that further comprises a master identification sub field that represents a master identification value that uniquely identifies the master device, such that multiple master devices can be simultaneously configured to the slave memory;
after the master device transmits the address value to the slave memory, but before the master device receives the retrieved data from the slave memory, the master device does not retain the address or line value; and
the master device is adapted to handle multiple, parallel data requests without maintaining a queue identifying the multiple, parallel data requests.

20. The apparatus of claim 19, wherein the apparatus is the master device.

21. The apparatus of claim 19, wherein the apparatus is the computer system having the master device and the slave memory.

* * * * *